Aug. 19, 1969     V. A. FALCO     3,461,820
FOOD PROCESSING MACHINE
Filed March 21, 1966     3 Sheets-Sheet 1
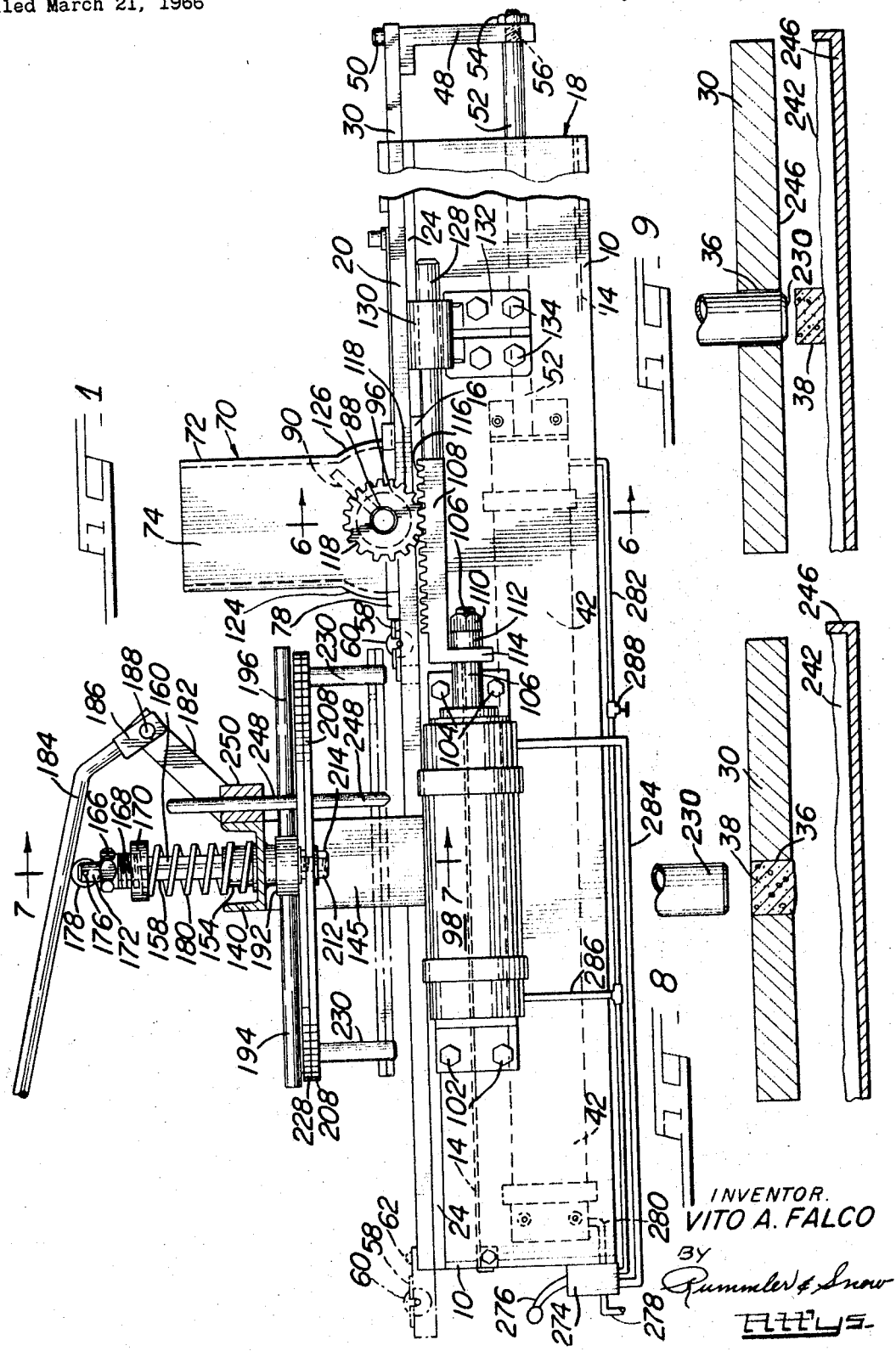
INVENTOR.
VITO A. FALCO

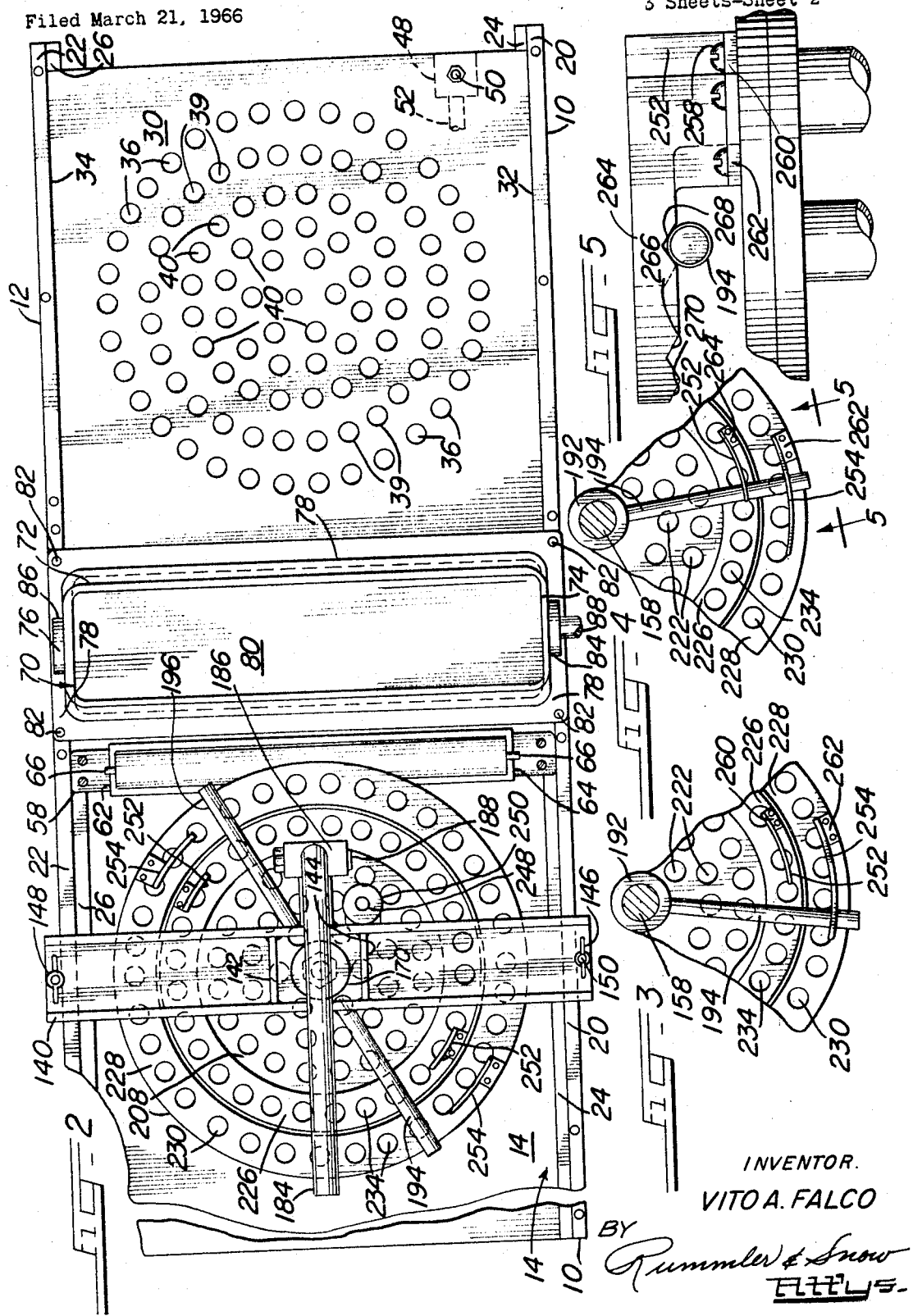

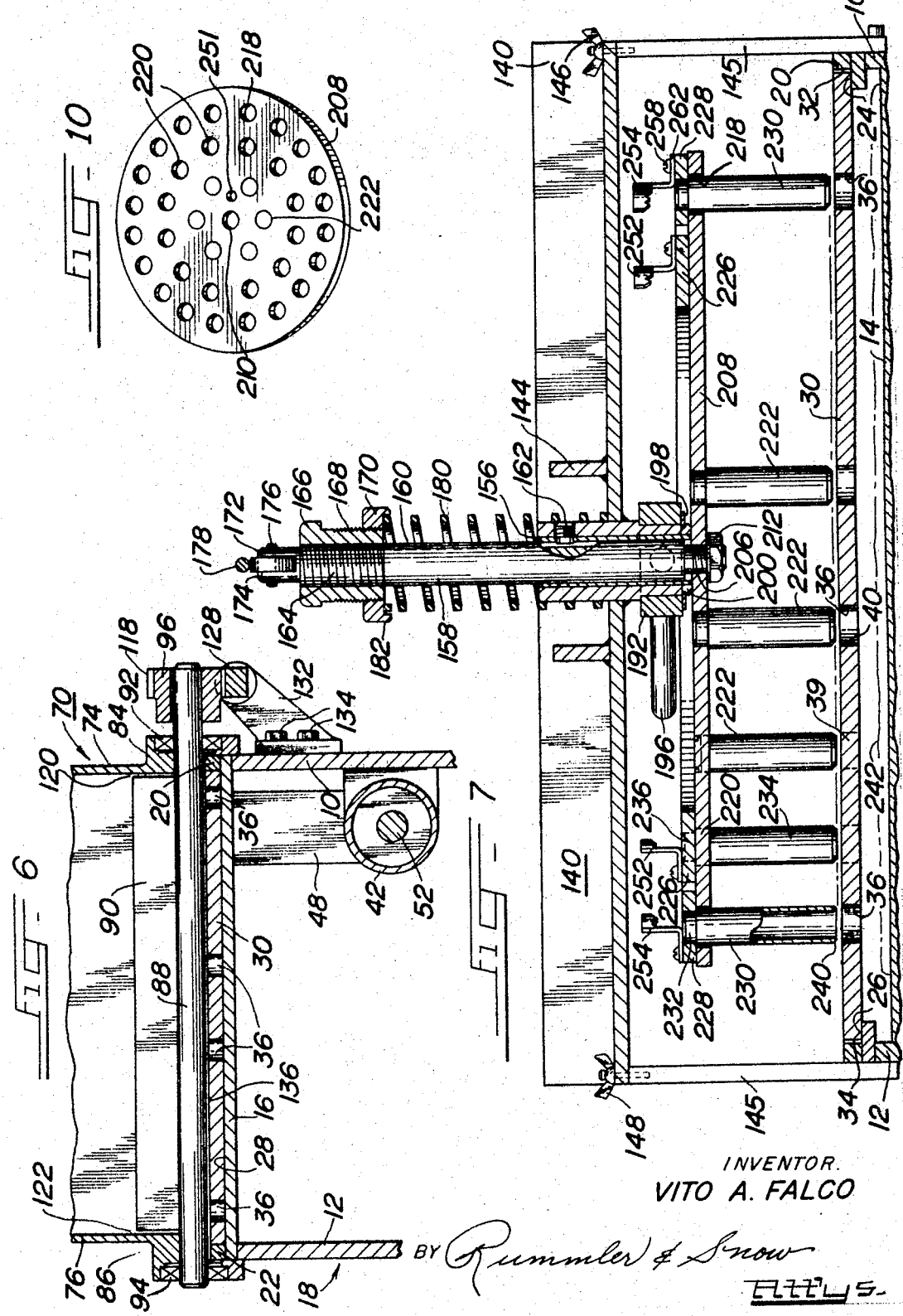

United States Patent Office 3,461,820
Patented Aug. 19, 1969

3,461,820
FOOD PROCESSING MACHINE
Vito A. Falco, 2643 W. 87th St.,
Chicago, Ill. 60642
Filed Mar. 21, 1966, Ser. No. 536,052
Int. Cl. A21c 9/04; B29f 3/04
U.S. Cl. 107—15                              8 Claims

ABSTRACT OF THE DISCLOSURE

A device for forming and depositing a pattern of discrete portions of a food composition onto a prepared surface characterized by including a die plate movable between loading and depositing positions and having a pattern of openings therethrough for receiving the food composition, a food composition supply hopper having force means operable to force fill the die plate openings during movement of the die plate between set positions, and selectively operable plunger means for ejecting food composition from pre-determined ones of the die plate openings.

---

The preparation of open-face articles of food such as pizza pies for baking is largely a hand operation by the baker or chef wherein the dough is prepared in the desired size and shape, generally a flat circular piece, and one or more food preparations or compositions are layered thereon in any desired pattern or arrangement. The compositions or preparations used are of infinite variety to include cheese, anchovy, sausage, meat, mushroom and the like compositions. They may be in the form of pastes, thick sauces, or solid mixtures of foods and flavors of plaible unctuous consistency which are spread on to the top of the dough or pie piece as a layer of sufficient thickness and amount to cover the dough piece (pie crust) and be retained thereon during handling and baking. In some instances, two or more such food preparations are applied to the dough piece in parallel strips, layers or other designs. The application of the food preparations to the dough pieces is a tedious, time-consuming hand operation in which control of the amount and distribution thereof is lacking or left to the whims of the baker and often there is excess of such food preparations applied with consequent waste and unsightliness of the product. Any spill-over during baking may cause further unsightliness or unappetizing appearance of the baked product, necessitating cleaning of the ovens more often and is, of course, wasteful. If too little trim is applied the product may not be saleable. Applying the food preparations by hand also creates a sanitation problem.

The instant invention provides a device for applying such food preparations to dough pieces prior to baking which is characterized by its semi-automatic operation; applicability to dough pieces of different sizes; smoothness of mechanical parts; lack of lost motion; automatic lubrication of the means for dispensing the food preparation so there is no sticking or clogging of the parts; and control of the amount, density, compactness and location of each deposit or pellet of food preparation made. A feature of this invention is the provision of a device which is readily disassembled and cleaned thus meeting the most rigid standards of health and sanitation. Other features of this invention are the provision of means for filling a reciprocating die as it is moving within the frame of the device, so that there is little or no lost motion and the individual packets or pellets of food preparation are of uniform and controlled density and are evenly distributed upon the dough piece; and the provision of a pizza pie making machine adaptable to a different size or diameter dough pieces which is easy to operate in a safe and sanitary manner.

Accordingly, it becomes a primary object of this invention to provide a food processing machine which is characterized by its adaptability, speed of operation, smoothness of operation ease of cleaning, and automatic lubrication of essential parts.

Another object of this invention is to provide a food preparation machine embodying means for holding a dough piece, means to supply food composition to the machine, sliding means for receiving and forming pellets of the food composition, means for continuously compressing the food composition, means for depositing the pelleted food composition on the dough piece, and means for automatically lubricating the depositing means.

A further object of this invention is to provide a device for forming and depositing pellets of food composition characterized by close control of the density or compactness of each pellet, even distribution thereof, freedom from clogging and other stoppages, all under strict sanitary conditions.

These and other objects of this invention will become obvious or be described as this specification proceeds.

A specific embodiment of this invention will be described in relation to the accompanying drawings, though not limited thereto, wherein FIGURE 1 is a longitudinal side view in partial section showing the over-all assembly of the machine;

FIG. 2 is a top plan view of the same;

FIG. 3 is a fragmentary plan view of the hanger arrangement shown in FIG. 1, the hanger for the depositing means being in a first position;

FIG. 4 is a like view of the same showing the hanger in a second position;

FIG. 5 is an enlarged fragmentary side view taken along lines 5—5 of FIG. 4;

FIG. 6 is a fragmentary cross-sectional view taken along lines 6—6 of FIG. 1;

FIG. 7 is a cross-sectional view of the apparatus taken through the depositing means or knock-out assembly along line 7—7 of FIG. 1;

FIG. 8 is a fragmentary cross-sectional view showing the relationship of the pastry, die plate and a knock-out pin before depositing the filling or food composition;

FIG. 9 is a like view showing the relationship of the parts after depositing the filling or food composition; and FIG. 10 is a perspective top view showing the primary knock-out pin plate arrangement.

Referring to the drawings, FIG. 1 shows the device to comprise a side frame member 10 and corresponding opposite side frame member 12 (FIGS. 2, 6 and 7) which are held in parallel relationship by means of bottom plate 14 and a die supporter backing plate 16 (FIG. 6) to form a unitized frame assembly referred to generally as 18.

This frame is open-ended to allow for freedom of moving parts, access thereto for the purpose of introducing the materials used by the machine, easy cleaning, etc. and the frame normally rests upon a work table or bench so that the device is easily operated by a person in the standing position.

Frame 18 has a pair of longitudinal guide members 24 and 26 (FIGS. 2 and 7) extending inwardly from the open ends of said frame 18 to said backing plate 16 and projecting laterally inward from the side members, thereby providing continuous sliding surfaces (FIGS. 2 and 7) which are contiguous with the top surface 28 of backing plate 16 (FIG. 6) forming part of the continuous sliding surface in a common horizontal plane. The guide members 24 and 26 and the backing plate 16 are secured onto the top edges of the respective side members 10 and 12 by means of hold-down bars 20 and 22 which also serve a guiding function as will appear. Between the hold-down bars 20 and 22 and resting in sliding relationship on the top surfaces of the guide members 24, 26, and backing plate 16 is a die plate 30 (FIGS. 1, 2, 6, 7, 8, and 9). Die plate 30 is a rectangular plate having parallel edges 32 and 34 (FIGS. 2 and 7) adapted to guide same in a straight-line relationship between the hold-down bars 20 and 22 and has a plurality of holes or die apertures 36 (FIGS. 2, 6, 7, 8, and 9) serving as receptacles for filling or trim food composition for subsequent ejection as a pellet illustrated at 38 in FIGS. 8 and 9, the formation of which is to be described.

Die holes 36 are shown in concentric ring arrangement in FIG. 2. The invention is not to be limited to this arrangement and the concentric rings shown as merely illustrative. However, as will become apparent, those parts of this device which cooperate with holes 36 must be similarly arranged. Also for purposes of clarity in this description the outer (circumferential) row of holes will be referred to as 36, the next or second circumferential row as holes 39, and the inner group of holes comprising the 3rd, 4th and 5th concentric rows, together with the single center hole, as holes 40. As will be described these three groups of die holes are usable independently in a certain sequence in order to deposit food composition 38 (FIGS. 8 and 9) on dough surfaces of different sizes or diameters.

Die plate 30 is equipped with means for attachment to a fluid pressure cylinder 42, which means comprises bracket 48 (FIGS. 1 and 2) attached to the die plate by means of bolt 50. The lower end of bracket 48 is attached to piston rod 52 (FIG. 1) of hydraulic cylinder 42 by means of nut 54, threaded end 56 of rod 52 passing through a hole in the end of bracket 48 to make this connection. Other means of attachment may be used and are obvious, as long as a rigid connection is made between die plate 30 and rod 52. The operation of hydraulic cylinder 42 and its relationship to die plate 30 and the other parts of this device will be described subsequently.

The opposite end of die plate 30 carries lubricant tray 58 (FIGS. 1 and 2) comprising an elongated open-topped container having a horizontal lubricating roller 60, rotatably mounted therein to project upwardly above the top surface of the die plate. Tray 58 is mounted on the end of die plate 30, opposite the piston rod connection 48, by means of a laterally projecting flange 62. Lubricant tray 58 travels back and forth with die plate 30 and is shown in phantom at its left-hand position in FIG. 1. Its function will be hereafter described.

The die hole arrangement 36–39–40 and the lubricant tray 58 are spaced from each other a sufficient amount to accommodate food composition hopper 70 (FIGS. 1 and 2) which comprises an open-topped container having side walls 72 and end walls 74 and 76 terminating in bottom flange 78. A cover member 80 (FIG. 2) is provided for hopper 70 for sanitary purposes. Cover 80 is removed in the embodiment shown in FIG. 1.

Hopper 70 is held to frame members 10 and 12 by means of screws 82 (FIG. 2) in which position it is directly over backing plate 16 (FIG. 6) which is of a width slightly greater than the width of the hopper base. The bottom ends of end walls 74 and 76, as shown in FIG. 6, carry or are formed into trunnions 84 and 86 (FIGS. 2 and 6) through which shaft 88 passes along the lengthwise centerline o fthe hopped bottom opening for carrying pressure flap 90. Shaft 88 is rotatably mounted in trunnions 84 and 86 by means of bearings 92 and 94 (FIG. 6).

On one end of shaft 88 and splined (not shown) thereto is pinion gear 96 (FIGS. 1 and 6). Hydraulic cylinder 98 of the double acting type (FIG. 1) is held to the outside of frame 18 by means of bolts 102 and 104. The piston rod 106 of hydraulic cylinder 98 extends toward the rear of the machine and has rack 108 attached thereto by means of nut 110 and retaining washer 112 through which rod 106 extends. The teeth 116 of rack 108 engage the teeth 118 of pinion 96. This cylinder-rack and pinion arrangement has been omitted from FIG. 2.

As shown in FIG. 6 shaft 88 carries longitudinal pressure flap 90, welded or otherwise attached thereto, within the inner walls of hopper 70 and has its ends closely spaced therefrom as shown at spaces 120 and 122. The back and forth movement of hydraulic cylinder 98, rod 106 and rack 108 turns pinion 96, shaft 88 and pressure flap 90 in a back and forth rotary motion. Hopper 70, designed to carry a supply of filling material or food composition such as ground meat (shown only in FIGS. 8 and 9) has a flared base formed by outwardly rounded portions 124 and 126 within which pressure flap 90 rotates. On so doing, flap 90 passes in juxtaposition with the curved parts 124 and 126 of hopper 70, compressing the food composition downwardly against die plate 30, and as the die plate moves beneath the hopper at the same time, forcing compressed food composition into each die aperture 36–39–40. Curved parts 124 and 126 of hopper 70 conform to the radius of curvature of the arc traced by the free edge of pressure flap 90 and are closely spaced therefrom as it moves back and forth. The total movement of flap 90 is at least enough to compress food composition downwardly thereunder against the die plate 30 and need not be greater than 180°. The extended end of rack 108 (FIG. 1) is in the form of a guide rod 128 which slides in the guide member 130 held to frame 18 by means of bracket 132 and bolts 134. Rod 128 can be of any cross-sectional configuration such as cylindrical or square as illustrated in FIG. 6. Guide 130 has an aperture therethrough which fits in close sliding relationship with guide rod 128.

As seen in FIG. 6 the lower portion of shaft 88 is adjacent and closely spaced from die plate 30, e.g. space 136 so that the only outlet for compressed filling material is into the die apertures 36–39–40 of die plate 30. Backing plate 16, upon which die plate 30 rests and slides, prevents the food composition from passing through the apertures and allows for the formation of a compressed pellet of food composition as shown at 38 in FIGS. 8 and 9. As shown in FIGS. 1 and 2, the pattern of the die plate apertures is generally circular in arrangement and occupies an area considerably greater than that of the bottom opening of the hopper 70.

Thus far, the device has been described in relation to the frame members 18, parts of the hydraulic system, the means for feeding and dispensing food composition and part of the operation of the die plate 30. Following is a description of the knock-off assembly adapted to deposit the pelleted food composition on the pastry dough.

FIGS. 1, 2, and 7 show support beam 140 in the form of a U-beam, having (optional) welded therein cross-reinforcing members 142 and 144, attached across support members 145, extending from the side frame members 10 and 12 (FIG. 7), and held thereto by means of thumb screw 146 and 148 respectively. Collar member 154 extends through beam 140 and is welded thereto or otherwise attached. Collar 154 has internal bushing 156 acting as a vertical sliding bearing for push rod 158 carried thereby. Rod 158 has a longitudinal key-way 160 extending therein and set-screw 162 extends through a threaded opening in collar 154 into key-way 160. By this means rod 158 can be moved up and down without turning about its longitudinal axis. The upper end of rod 158 is threaded as at 164 and has cap-nut 166 engaged thereto. Cap-nut 166 in turn has external threads 168 engaged by adjusting nut 170. Also the top end of rod 158 is bifurcated to provide spaced arms 172 and 174, carrying axle 176 fitted through roller 178. Helical spring 180 is carried between adjusting nut 170, having marginal shoulder 182, and the bottom of cross-beam 140, the spring surrounding the collar 154.

A bracket arm 182 (FIG. 1) is rigidly attached to the side of U-beam 140 and carries an operating handle or lever 184 at its outer end, the lever being bifurcated at its connected end to provide spaced fingers 186 for pivotal mounting on a bolt 188 which functions as a fulcrum. It is seen that by depressing handle 184 it is brought to bear on roller 178 and causes rod 158 to move downward against the bias of spring 180. Release of the pressure on handle 184 allows the rod 158 and spring 180 to return to their normal position.

Still referring to FIGS. 1 and 7, the lower end of collar 154 is of reduced diameter to receive rotatable collar or hanger 192 from which hanger rods 194 and 196 extend in radially opposite directions. Hanger 192 is held to collar 154 by means of split washer 198, which may be of any suitable material, to provide a bearing surface. The recessed portion of collar 154 has lip 200 holding washer 198 in place against the bottom of rotatable collar 192.

The threaded and reduced diameter bottom end 206 of rod 158 extends through a main knock-off plate 208 (FIGS. 7 and 10) through its center hole 210 and a nut 212 with a lock washer holds the plate 208 to the rod. As shown in FIG. 10, plate 208 has outer circumferential holes 218, intermediate circumferential holes 220 and a plurality of inner knock-out pins 222 also circumferentially arranged.

The main knock-off plate 208 supports, in one embodiment, an inner knock-off ring 226 and an outer knock-off ring 228. Outer knock-off ring 228 has a plurality of circumferentially arranged knock-out pins or plungers 230 (FIG. 7) and each is attached by means of neck 232 which is press-fitted into a suitable hole in the body of the ring. Knock-out pins 230 are slightly smaller in diameter than holes 218 in the plate 208 so as to pass in close-fitting sliding relationship therethrough. A similar arrangement of knock-out pins 234 is attached by means of press-fitted necks 236 to inner knock-out ring 226. The knock-out pins 230 on outer ring 228 arranged to fit into and coincide with all of the peripheral holes 218 of main knock-out plate 208 and similar knock-out pins 234 of ring 226 are arranged to fit into and conicide with all of the intermediate holes 220 of main knock-out plate 208. It is thus seen that the pins 222 are carried by plate 208 only, while pins 230 and 234 are carried by rings 228 and 226 respectively and the entire knock-out assembly is carried by shaft or rod 158 against the bias of spring 180.

All of the knock-out pins may be hollow for lightness and are open at their bottoms as shown at the part section of pin 230 (FIG. 7). The bottoms of the knock-out pins may be closed if desired and in either case the bottom edge periphery of each is chamfered as at 240. As shown, the entire arrangement of inner-most pins 222, held by main knock-off plate 208, intermediate pins 234, held by inner knock-off ring 226 and outer or peripheral knock-out pins 230, held by outer knock-off ring 228, coincide respectively with and are long enough to pass into and through the holes 36, 39 and 40 of die plate 30 when lever 184 is depressed. Thus, when the die holes 36, 39 and 40 of die plate 30 are filled with ground meat or other food composition, this action pushes the pellets 38 therein (see FIGS. 8 and 9) out on to the surface of a pastry piece 242 supported by the shelf 14. The lengths of all of the knock-out pins (FIG. 7) are the same and they extend a sufficient distance below plate 208 that upon reciprocation of rod 158 the maximum stroke will be less than the pin length. It is by this means that the pin rings 226 and 228 are kept in angular register with the main plate 208.

A fixed guide rod 248 is mounted vertically on a bracket 250 secured to the cross member 140 and extends through main knock-off plate 208 to the limit of its downward motion. The hole for guide rod 248 in main knock-off plate 208 is shown at 251 in FIG. 10. It may or may not be the same size as the other holes 220, etc. Also, guide rod 248 may be of any cross sectional configuration, e.g., round, square, etc., as long as it serves the function of cooperating with key-slot 160 in rod 158 to keep the pins in plate 208 in vertical alignment with the holes in the die plate 30 when it is in depositing position.

A particular feature of this invention is the provision of a means whereby pastry products of different sizes may be prepared. To accomplish this, provision is made whereby outer knock-out ring 228 alone or together with inner knock-out ring 226 are prevented from lowering with main knock-off plate 208 when the lever 184 is operated. Such means comprise the rotatable collar 192 and hanger rods 194 and 196 which extend radially outward and are engageable with selective ones of diametrically opposed pairs of catch members 252 and 254 (see FIGS. 2, 3, 4, 5 and 7), held respectively to inner knock-off ring 226 and outer knock-off ring 228 by means of screws (FIG. 3) passing through base flange members 260 and 262 thereof.

Catch member 254 (FIG. 5) is shown to have an angularly extending arm 264 with transverse notches 266 and 268 spaced on the underside thereof for engagement with hanger rod 194, the rod 194 being shown in engagement with notch 268. Since collar 192 is journalled on collar 154, the hanger rods 193 and 196 are engageable with notches 266 or 268 of the respective catch members 254 merely by rotation from a position shown in FIG. 2 to the position shown in FIGS. 3, 4 and 5. Bevel 270 on the leading edge of arm 264 allows the rod 204 to engage notch 266 or 268 by a slight lifting action on the ring plates 226 and 228. It is to be observed that (as in FIGS. 3 and 4) the two bracket members 252 and 254 are offset angularly on their respective rings 226 and 228 such that the first engagement of rods 194–196 is with notch 266 of arms 264, thus holding only outer ring 228 in suspended position, while the next rotational movement of rods 194–196 brings it into engagement with arm of bracket 252 in a notch radially aligned with notch 268 of catch member 254 (see FIGS. 3 and 4) as well as into engagement with said notch 268. This second position of hanger rods 294–296 holds both rings 226 and 228 from downward movement with main knock-off plate 208. When the lever 184 is operated it is thus seen that when the hanger rods are not in engagement with brackets 252 and 254, as in FIG. 2, the entire knock-out assembly is free to move downwardly with push rod 158 under the action of lever 184, and in doing so brings all of the knock-out pins into position within the holes 36, 39 and 40 of die plate 30 to dress the larger size pastry or pizza. With rods 194 and 196 in engagement with catch members 254 only (notch 266 thereof), outer ring 228 is held in raised position and inner ring 226 moves downwardly with main knock-out plate 208, thus bringing the corresponding intermediate knock-out pins 234 into engagement with the intermediate holes 39 and innermost pins 222 into engagement with holes 40 of die plate 30 to dress a pizza of intermediate size. And lastly, with rods 194–196 in the position shown in FIGS. 4 and 5, engaging both pairs of catch members 252 and 254 both rings 226 and 228 are held in raised position and only the main knock-out plate 208, with its pins 222, is lowered to engage the innermost holes 40 of the die plate 30 to dress the smaller pizza.

As shown, either of the rods 194–196 can be used as a handle for rotating them into or out of a position of engagement with the hanger members as just described. The rods 194 and 196 form a balanced, easily rotated hanger assembly which is readily removed, cleaned and reinstalled.

FIG. 1 shows the fluid pressure system, comprised air or liquid, for operating the reciprocating die plate 30 and the filler means 70. As shown the system comprises a 4-way valve 274 having operating handle 276, located at the front end of the machine of this invention. The motivating fluid for the machine enters the system via line 278 and passes under the control of valve 274 to one side or the other of the piston (not shown) in each of the respective hydraulic cylinders 42 and 98 via lines 280 and 282 for cylinder 42 and via lines 284 and 286 for cylinder 98. Line 282 is also controlled by speed control valve 288 as will be described.

The operation of the device of this invention is as follows:

Assuming that a source of pressurized fluid is connected to line 278, that hopper 70 contains freshly ground meat, that a pizza dough piece 242 is in position under the knock-out assembly and that pressure flap 90 and die plate 30 are in the position shown in FIG. 1.

(1) To form a pizza of maximum size (diameter) ready for baking, hanger rods 194 and 196 are moved out of engagement with brackets 252 and 254 as shown in FIG. 2, valve handle 276 is moved to its first position allowing fluid to pass into lines 286 and 282 and out of lines 284 and 280. This causes pressure flap 90 to rotate counter-clockwise (as seen in FIG. 1) and compress meat against die plate 30. At the same time die plate 30 is moved from its rearward (right hand) position to its forward (left hand) position and as the die holes pass under the compressed meat they are filled against backing plate 16. As the lubricating roller 60 passes under the plungers, their flat ends 238 are contacted by the roller and lubricant picked up by the roller from its reservoir is applied to each. When the die plate 30 comes to rest under the knock-out assembly, lever 184 is pulled downward and all of the knock-out pins 222, 230 and 236 enter the respective holes to displace the meat from the die plate and deposit it as a plurality of discrete pellets onto the dough piece. The dough piece is then removed for baking.

(2) Removal of the dough piece is facilitated by turning valve 274 to its second position wherein the flow of fluid in lines 280, 284 and 286 is reversed. This causes die plate 30 to move rearwardly (to the right in FIG. 1) and pressure flap 90 to rotate clockwise. Roller 60 again lubricates the plunger ends, to prevent meat pellets sticking thereto and as the die plate 30 passes over backing plate 16, the die holes are again filled with meat under pressure of the flap 90. A new dough piece is then placed on shelf 14 below the knock-out assembly and valve lever 274 is moved to the first position. Pressure flap 90 now reverses and the holes in die plate 30 receive any additional meat not supplied by the previous pass under the hopped 70.

(3) Lever 184 is then operated to deposit the meat in the die plate 30 onto the dough piece and the machine is ready for repeated operation as long as dough pieces needing a meat deposit are available.

In the foregoing demonstration of the operation of the device of this invention, cylinders 42 and 98 were operated in opposite directions. These cylinders may be operated in the same direction or with a time delay between their motions as desired. The machine also may be operated so that die plate 30 will be filled with material to be deposited only as it passes to the front (right to left) of the machine in which case pressure flap 90 will be operated only when the die plate moves toward the front of the machine.

To prepare a pizza of intermediate size it is only necessary to move hanger rods 194 and 196 to engage notch 266 of the respective brackets 254, as in FIG. 3, and repeat the operations above outlined. Similarly to prepare a pizza of smaller size hanger rods 194 and 196 are moved into engagement with notch 268 of the respective brackets 254 and at the same time into notch 272 of the respective brackets 252 and the foregoing operational steps are repeated.

Any desired lubricant may be used in tray 58 including, but not limited to, suitable sauces, melted butter, tomato sauce, or any other suitable flavoring material.

From the foregoing description of this invention it is apparent that various changes and modifications can be made without departing from the spirit of the invention. For instance guide members 20 and 22 may be integral with sides 10 and 12. Die plate 30 may be made with any desired arrangement of holes for receiving meat as long as the disposition of the knock-out pins is made likewise. It is also apparent that the die holes, guide holes and plungers need not be circular or arranged in circles and that other shapes and arrangements will become obvious to one skilled in the art having the benefit of this disclosure.

It is desirable that the various parts of this machine be fabricated of rust-resistant metal such as clad or stainless steel, both for purposes of sanitation and durability.

I claim:
1. In a food processing machine the combination of:
(a) a food composition hopper having an elongate generally rectangular open bottom extending transversely of the machine and including force means within said hopper for pressing a food composition downwardly through the open bottom thereof and a back-up plate spaced below the open bottom of said hopper and of a size to include the projected area thereof,
(b) a die plate supported below said hopper by said back-up plate and having a plurality of die holes therethrough disposed in a pattern for receiving a food composition from said hopper,
(c) a knock-out assembly adjacent said hopper including a downwardly movable plunger for each of said die holes, said plungers being arranged in a pattern to register with said die holes,
(d) means for shifting said die plate to move the pattern of die holes across said open bottom of said hopper to a position under said knock-out assembly whereby said plungers are registered with said die holes,
(e) means for operating the hopper force means simultaneously with the movement of the die plate, and
(f) means for moving said plungers downwardly through said die holes for ejection of food composition therefrom when the die holes are positioned in register with said knock-out assembly,
(g) said force means comprising a rotatable shaft extending along the lengthwise center-line of the hopper opening, and a longitudinal fin fixed on said shaft for swinging movement from side to side of the hopper above said opening, and said operating means is arranged to oscillate said shaft and fin once for each reciprocative movement of the die plate.

2. A food processing machine comprising a food composition hopper having an opening bottom end and means for pressing a food composition downwardly through said open bottom end, a die plate disposed against said open bottom end and having a plurality of die holes arranged in a pattern and opening through the plate for receiving food composition from said hopper, a knock-out assembly adjacent said hopper including a vertically reciprocable knock-out plate having a plurality of downwardly projecting plungers arranged in a pattern to register with said die holes, means for shifting said die plate to move the said pattern of die holes from the open bottom of said hopper to a position below said knock-out plate whereby said plungers are registered with the die holes for entry thereinto, and means for reciprocating said knock-out plate to cause said plungers to eject food composition downwardly from the said die holes, characterized in that the die holes of said die plate are arranged in inner and outer group patterns, the plungers on said knock-out plate are arranged for registration with the inner group pattern of die holes, an outer knock-out frame is positioned on and above said knock-out plate and has a plurality of depending plungers extending through corresponding holes in said knock-out plate for registration with the outer group pattern of die holes, and means is provided for selectively engaging and holding said knock-out frame from downward movement with said knock-out plate.

3. A food processing machine comprising a food composition hopper having an open bottom end and means for pressing a food composition downwardly through said open bottom end, a die plate disposed against said open bottom end and having a plurality of die holes arranged in a pattern and opening through the plate for receiving food composition from said hopper, a knock-out assembly adjacent said hopper including a vertically reciprocable knock-out plate having a plurality of downwardly projecting plungers arranged in a pattern to register with said die holes, means for shifting said die plate to move the said pattern of die holes from the open bottom of said hopper to a position below said knock-out plate whereby said plungers are registered with the die holes for entry thereinto, and means for reciprocating said knock-out plate to cause said plungers to eject food composition downwardly from the said die holes, characterized in that the die holes of said die plate are arranged to include inner, intermediate and outer concentric patterns thereof, the plungers on said knock-out plate are arranged for registration with said inner pattern of die plate holes, and intermediate and outer apertures are provided in said knock-out plate for registration with the intermediate and outer concentric patterns of die holes in said die plate; an outer knock-out frame is supported by said knock-out plate and has a plurality of downwardly depending plungers extending through said outer pattern of apertures of said knock-out plate; an inner knock-out frame is supported by said knock-out plate and has a plurality of downwardly depending plungers extending through said intermediate pattern of apertures, and means are provided for engaging and holding said knock-out frames against reciprocation with said knock-out plate.

4. A food processing machine in accordance with claim 3 in which said knock-out plate is mounted on the bottom end of a vertically movable shaft and said means for holding said knock-out frames comprises a rotatable collar on said shaft above said knock-out plate, a hanger rod extending radialy from said collar and angularly movable therewith, and hook means attached to each of said knock-out frames, said hook means being engageable with said hanger rod.

5. A food processing machine comprising in combination:
(a) a frame having spaced longitudinal guide members;
(b) a transverse back-up plate extending between said guide members medially of the length of said frame;
(c) a food composition hopper having an open bottom extending between said guide members and spaced upwardly from said back-up plate in register therewith;
(d) a die plate slidable on said guide members between said back-up plate and the open end of said hopper, said die plate having a plurality of openings therethrough for receiving food composition from said hopper,
(e) force means comprising an upright pressure flap extending centrally from end to end of the open bottom of said hopper and mounted on a rotatable shaft extending transversely of said frame;
(f) means for reciprocating said die plate to shift the openings therein between a position under said open bottom of the hopper and a depositing position displaced laterally of the hopper,
(g) means for operating the said force means simultaneously with the movement of the die plate, for driving food composition toward the open bottom of the hopper to fill the openings in said die plate, and
(h) means for ejecting the food composition from said die plate openings at said depositing position.

6. A food processing machine in accordance with claim 5 in which said operating means is arranged to oscillate said shaft and upright flap.

7. A food processing machine according to claim 6 wherein the portion of said hopper above the path of the free edge of said flap during its oscillation is of less width than the said hopper opening, the said opening is substantially twice as wide as the radius of the path of the free edge of said flap, and the side walls of said hopper adjacent said opening converge upwardly and arcuately along the path of the free edge of said flap.

8. A food processing machine comprising in combination:
(a) a frame having spaced longitudinal guide members;
(b) a transverse back-up plate extending between said guide members medially of the length of said frame;
(c) a food composition hopper having an open bottom extending between said guide members and spaced upwardly from said back-up plate in register therewith;
(d) an upright pressure flap extending centrally from end to end of the open bottom of said hopper and mounted on a rotatable shaft extending transversely of said frame;
(e) means to oscilalte said pressure flap from side to side within said hopper for urging material in the hopper toward the open bottom thereof;
(f) a die plate having a plurality of die holes therethrough arranged in a predetermined pattern, said die plate being supported in slidable relationship upon said guide members and back-up plate for reciprocation between a fiilling position under said hopper and an ejection position adjacent one end of said frame;
(g) means for reciprocating said die plate to and from said positions; and
(h) an ejection assembly on said frame at the ejection position of said die plate, said assembly comprising:
(1) a transverse support;
(2) a bearing member attached to said transverse support and having a vertical passage therethrough;
(3) a shaft reciprocably mounted in said bearing member and extending through said transverse support;
(4) a retaining collar fixed on said shaft adjacent its upper end;
(5) a spring member acting between said support and said collar for biasing said shaft upwardly;
(6) means for forcing said shaft downwardly against the bias of said spring member;
(7) a knock-out plate attached to the bottom end portion of said shaft, said knock-out plate having a plurality of depending plungers adjacent the center thereof arranged for registery with the holes adjacent the center of the die hole pattern of said die plate;
(8) a knock-out frame normally supported by said knock-out plate and having a plurality of downwardly depending plungers passing through guide holes in said knock-out plate arranged in surrounding relation with the group of plungers on said knock-out plate and matching the pattern of corresponding holes in said die plate;
(9) and means for selectively holding said knockout frame immovable during movement of said shaft and knock-out plate;
(i) and means for operating said pressure flap oscillating means during movement of said die plate between the filling and ejecting positions thereof.

References Cited

UNITED STATES PATENTS 3,359,925  12/1967  Porada.
3,203,037  8/1965  Anhanger et al. _____ 17—32
3,221,672  12/1965  Falco.
3,241,178  3/1966  Bridge.

ROBERT W. MICHELL, Primary Examiner

JOSEPH SHEA, Assistant Examiner

U.S. Cl. X.R.

17—32; 107—1; 222—266, 361